Feb. 2, 1926.  
G. D. CASPER  
DRAIN TRAP  
Filed April 9, 1923
1,571,707
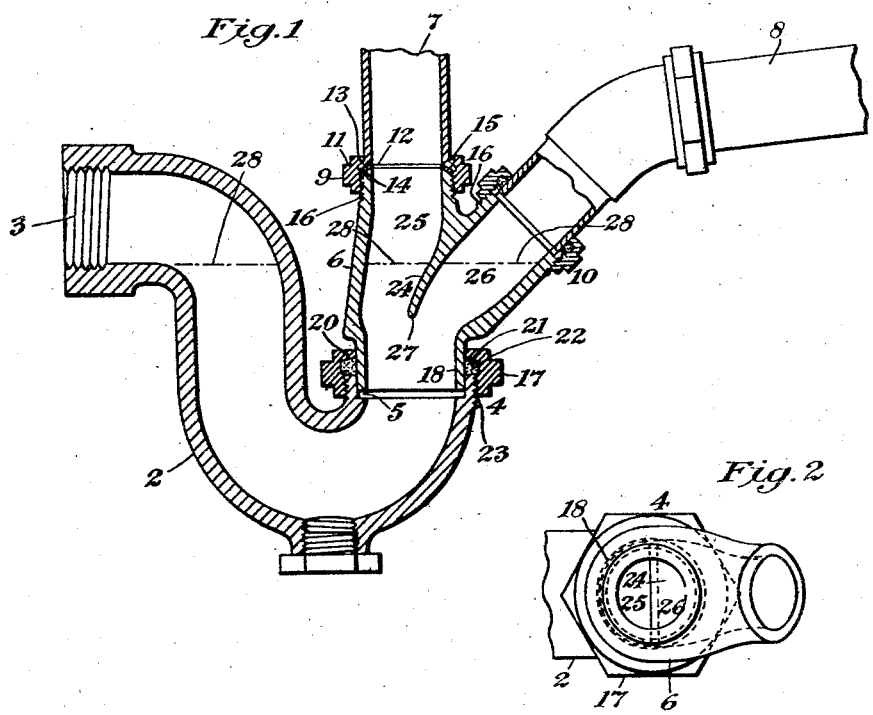
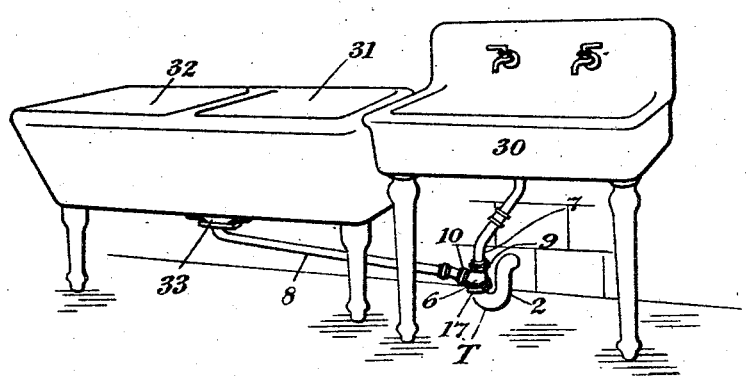
Inventor  
George D. Casper  
By his Attorney  
Charles D. Ting.

Patented Feb. 2, 1926.

1,571,707

UNITED STATES PATENT OFFICE.

GEORGE D. CASPER, OF NEW YORK, N. Y., ASSIGNOR OF ONE-HALF TO WILLIAM W. SCHUSKY, OF LONG ISLAND CITY, NEW YORK.

DRAIN TRAP.

Application filed April 9, 1923. Serial No. 630,710.

*To all whom it may concern:*

Be it known that I, GEORGE D. CASPER, a citizen of the United States, and a resident of New York, in the county of Queens and State of New York, have invented certain new and useful Improvements in Drain Traps, of which the following is a specification.

This invention relates to drain traps and particularly to drain traps adapted for connection to laundry tubs, kitchen sinks and the like.

The main object of the invention is to provide a drain trap for connection to such receptacles which will not require lead pipes and wiped joints but which can be quickly and conveniently installed merely by using wrenches and with full compliance with the sanitary regulations and ordinances now customary in towns and cities.

Another object is to provide such a drain trap that will be adapted for connection to a plurality of tubs, sinks or the like and which will prevent the passage of sewer gas or objectionable odors, from one tub or other receptacle to another in the same system, through the piping.

The means I prefer to employ for accomplishing the above objects together with other advantageous features of my improved drain trap are illustrated in the drawing accompanying and forming part of this specification, and in which—

Figure 1 is a vertical section partly in elevation of a drain trap embodying my improvements.

Fig. 2 is a plan of a portion of the same, and

Fig. 3 is a perspective view showing one manner of utilizing my improved drain trap.

Like characters of reference refer to like parts in all the figures of the drawing.

Referring to Fig. 1, the part or member of the drain trap which contains the outlet is designated by the numeral 2 and 3 indicates the outlet thereof. There is also a juncture or socket portion nearest to the inlet of the trap which juncture portion is indicated by 4, and there is preferably a socket therein such as 5. There is a member 6 which I term a connection member from the fact that the pipe connections are joined to this member. In the drawing I have shown two such connections for connecting the trap to two pipes such as indicated by 7 and 8 respectively. Any suitable means may be provided to connect the pipes 7 and 8 to the member 6 but ordinarily I employ couplings such as 9 and 10, that at 9 composed of a shouldered coupling nut 11 and a packing 12 clamped between a flange 13 on the pipe and the seat 14 on the member 6. A shoulder 15 on the coupling nut 11 engages the flange 13 of the pipe and causes the same to press against the packing 12 when the nut 11 is tightened on the thread 16 on the connection portion of the member 6. The coupling 10 is similar to that for the joint 4 as will be clear from the drawing.

The member 6 is held connected to the main portion 2 of the trap by any suitable means such as the coupling nut 17. The said coupling surrounds the tubular portion 18 of the member 6 which portion is preferably adapted to enter the socket 5 in the member 2. The nut 17 is provided with a shoulder 20 and a recessed portion 21 in which is placed suitable packing material 22 so that on clamping the nut 17 by turning its threaded portion on the thread 23 of the member 2, said packing material 22 will be squeezed against the tubular extension 18 of the member 6 and make a tight joint between said member and the member 2.

In the interior of the member 6 there is a partition 24 which divides the upper part of the interior of said member into two portions 25 and 26 and there is a free lower edge 27 of said partition which extends down considerably below the top of the water seal of the trap and which is indicated by 28, so that although water can flow down each of the pipes 7 and 8 and through the trap through the chambers 25 and 26 respectively and thence through the portion 18 and the member 2 to the outlet, no gases or odors can pass around from the pipe 7 through the member 6 and up the pipe 8 or vice versa. The member 6 is adapted to be changed to many different positions relatively to the member 2. That is it can be turned about on the axis of the socket 5 and can be moved upward or downward on previously loosening the nut 17, and when a desired position of the member is attained the said nut can be again tightened securing the members 2 and 6 in the selected position.

Fig. 3 illustrates one manner of using the drain trap which is here designated by T and shown connected to a sink 30 and two laundry tubs 31 and 32. Two pipes 7 and 8 are used, the pipe 7 connected to the sink 30 and the pipe 8 connected to the double fitting 33 which in turn is connected to both the tubs 31 and 32.

From the foregoing it will be clear that no lead piping is necessary in my improved installation and that the various couplings or pipe connections can be installed merely by the use of wrenches, and it will also be noted that no wiped joints are required for any of the trap connections. It will be obvious that so long as the water seal remains in the trap, no foul air or gas can pass from the tubs 31, 32, through the pipe 8, trap T, and then up the pipe 7 and out of the outlet of the sink 30.

What I claim is:—

A self-cleaning drain trap having a water seal and embodying a member having an outlet and a juncture portion on the inlet part thereof below the water seal surface, a member having a portion to fit said juncture portion of the first-mentioned member, adapted to be secured thereto in different positions both axially and vertically, and having two pipe connections both above the water seal, joining passages separated by a single wall that is above said juncture portion and whose lower edge is below the water seal surface and whereby the inlet pipes are water-sealed from each other, and in which inlet member the area of the lower orifice thereof exceeds any single cross section of either of said branch passages, and means below the water seal surface whereby the first-mentioned member and the member having said pipe connections are joined together at said juncture portion.

Signed at New York, in the county of New York, and State of New York, this 30th day of March, 1923.

GEORGE D. CASPER.